_United States Patent Office_

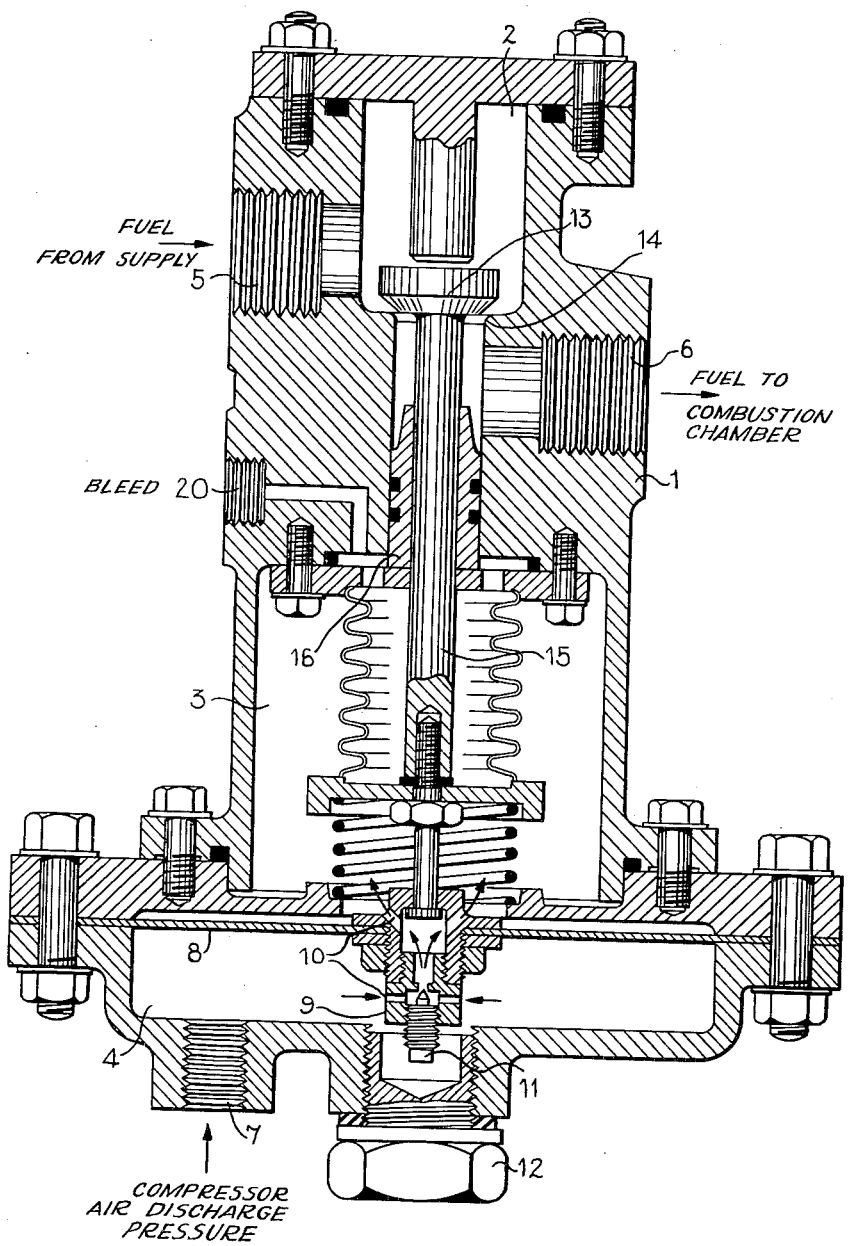

3,212,260
Patented Oct. 19, 1965

3,212,260
STALL TRIP PROTECTIVE DEVICE FOR
GAS TURBINES
Thomas Lowthian Gardner, Sale, and George Kenneth
Hawkin, Manchester, England, assignors to Associated
Electrical Industries Limited, London, England, a British company
Filed May 20, 1963, Ser. No. 281,722
Claims priority, application Great Britain, May 22, 1962,
19,684/62
2 Claims. (Cl. 60—39.28)

This invention relates to means for interrupting the flow of fuel to a gas turbine in order to protect the turbine from the effects of overheating in the event of a sudden drop in air mass flow. Such means is herein referred to as "stall trip protection."

In the operation of a gas turbine conditions can develop which result in the sudden breakdown of flow through the air compressor—variously referred to as stalling or surging. When this occurs it is accompanied by a considerable drop in air mass flow delivered by the compressor and, if nothing is done to reduce the fuel flow prevailing before the onset of the stall, an excessive temperature will result at the turbine inlet which may eventually seriously damage the turbine blading.

It is found in practice that temperature sensitive devices with a response fast enough to deal with an emergency of this sort are inherently weak and liable to premature failure, and it is considered better to use a device which operates directly as a result of the stall rather than one which depends on the temperature rise against which it is desired to protect.

When a stall occurs, it is usually accompanied by a sharp drop in compressor delivery pressure and as this takes place at a greater rate than in normal operation of the turbine, advantage can be taken of this to operate a trip valve in the fuel supply line.

Accordingly the invention consists in a method of protecting a gas turbine from the effects of sudden breakdown in the air flow through the compressor consisting in using the abnormally rapid drop in the system air pressure to actuate a device for reducing the fuel flow.

More particularly the invention provides a method of stall trip protection for a gas turbine, which consists in actuating a control valve in the fuel supply line to the turbine by means of a diaphragm which, in normal operation, is maintained in a state of balance by applying air at the system pressure in the steady state, e.g., compressor delivery pressure or a signal air pressure directly influenced by this delivery pressure, at a determined rate to one side of the diaphragm and at a relatively lower or restricted rate to the other side, whereby a sudden drop in delivery pressure due to compressor stalling will produce an unbalance of the diaphragm causing it to deflect to the one side and close the valve.

A stall trip valve according to the invention comprises two pressure chambers separated by a diaphragm, means for connecting one of the chambers to receive air from the chosen pressure tapping, a restricted bleed orifice connecting the two chambers whereby the pressure is equalised on both sides of the diaphragm, to maintain it in a state of balance during normal operation, and means connected to the diaphragm for effecting operation of the valve to restrict fuel flow upon deflection of the diaphragm due to an abnormal rate of decrease in the compressor delivery pressure.

In one embodiment of the invention the diaphragm is connected to one end of a spindle which passes through a gland in the chamber wall and operates a control valve in the fuel supply line to the turbine.

Preferably means are provided for adjusting the bleed orifice between the two chambers, to suit particular operating conditions.

The invention is not limited to the use of compressor delivery pressure only, as other stations (e.g. turbine inlet) could be used.

The accompanying drawing is a sectional elevation of a stall trip valve embodying the invention. The valve body 1 includes a valve chamber 2, and two pressure chambers 3, 4. Inlet and outlet ports 5, 6 are provided for connecting chamber 2 in the fuel supply line to a gas turbine. Chamber 4 can be connected to receive the desired signal air pressure through a port 7.

The two chambers 3, 4 are separated by a diaphragm 8 in the centre of which is an orifice member indicated generally by reference 9. Member 9 is provided with small orifices 10 permitting air to bleed across the diaphragm from chamber 4 to chamber 3 as indicated by the arrows. A screw 11 provides means for adjusting the rate of bleed and is accessible by removing plug 12 in the outer wall of chamber 4. Diaphragm 8 may be of metal, rubber or fabric suited to operating conditions.

A valve 13 for closing a seating 14 in chamber 2 is carried on one end of a spindle 15 which passes through a gland 16 into chamber 3. The other end of spindle 15 is connected to orifice member 9; it will be seen that a downward deflection of diaphragm 8 from the balanced position illustrated will move valve 13 towards seating 14.

In operation air pressure is applied through port 7 to the underside of diaphragm 8, and in normal operation of the turbine this pressure will also prevail, via bleed orifice 10, on the other side of the diaphragm which will remain undeflected. In the event of a stall in the compressor, the delivery pressure and hence the signal pressure will drop at a greater rate than the orifice will allow the pressure to balance out on each side of the diaphragm which will consequently deflect temporarily. Any back pressure of air or oil contained by the bellows, which would otherwise occur when the bellows are compressed as by the action of the valve, can be relieved through a port 20 provided in valve body 1.

According to an alternative arrangement deflection of the diaphragm can be used to operate an electrical switch or a servo valve which in turn can be made to shut off the fuel supply to the turbine so preventing any dangerous over-temperature.

As sudden loss of load on the gas turbine could result in a sudden drop in compressor delivery pressure which would actuate the trip, and as it is not usually desirable to shut down the turbine in such an event, it would be necessary to add to the tripping circuit means to render it inoperative in the case of loss of load.

What we claim is:
1. In a gas engine including a combustion chamber, a compressor, a turbine and a liquid fuel supply to the combustion chamber, an apparatus for protecting the turbine from the effects of sudden breakdown in the compressor air flow comprising, a pneumatic actuator communicating with the discharge end of the compressor stage of the turbine, means associated with said pneumatic actuator for rendering said actuator nonresponsive to the normal variation in compressor air discharge pressure occurring during normal operation of the compressor, said pneumatic actuator being responsive only to an abnormal sudden drop in compressor air discharge pressure indicative of the existence of stall conditions in the compressor, and a liquid fuel flow interruptor coupled to co-operate with the pneumatic actuator, the interruptor being effective, upon operation of the actuator in response to a sudden decrease in compressor air discharge pressure, to shut off the flow of liquid fuel to the combustion chamber.

2. Apparatus according to claim 1 wherein the pneumatic actuator comprises an enclosure divided by a diaphragm into two chambers, one of the chambers being in communication with the discharge end of the compressor, and said means associated with the pneumatic actuator comprises a restricted orifice dimensioned to produce a pressure difference across the diaphragm only as a result of the sudden rate of fall of compressor air discharge pressure indicative of the existence of stall conditions and not as a result of pressure variations produced during normal operation of the compressor.

References Cited by the Examiner

UNITED STATES PATENTS

| | | | |
|---|---|---|---|
| 1,829,907 | 11/31 | McCornack | 251—61 |
| 2,429,005 | 10/47 | Watson | 60—39.28 |
| 2,588,522 | 3/52 | Harris | 60—39.28 |
| 2,667,743 | 2/54 | Lee | 60—39.28 |
| 2,740,604 | 4/56 | Swigart | 251—61 |
| 2,869,322 | 1/59 | Rankin | 60—39.28 |
| 3,018,621 | 1/62 | Arnett | 60—39.28 |
| 3,104,524 | 9/63 | Flanders | 60—39.16 |

JULIUS E. WEST, *Primary Examiner.*

SAMUEL LEVINE, *Examiner.*